Patented Dec. 22, 1925.

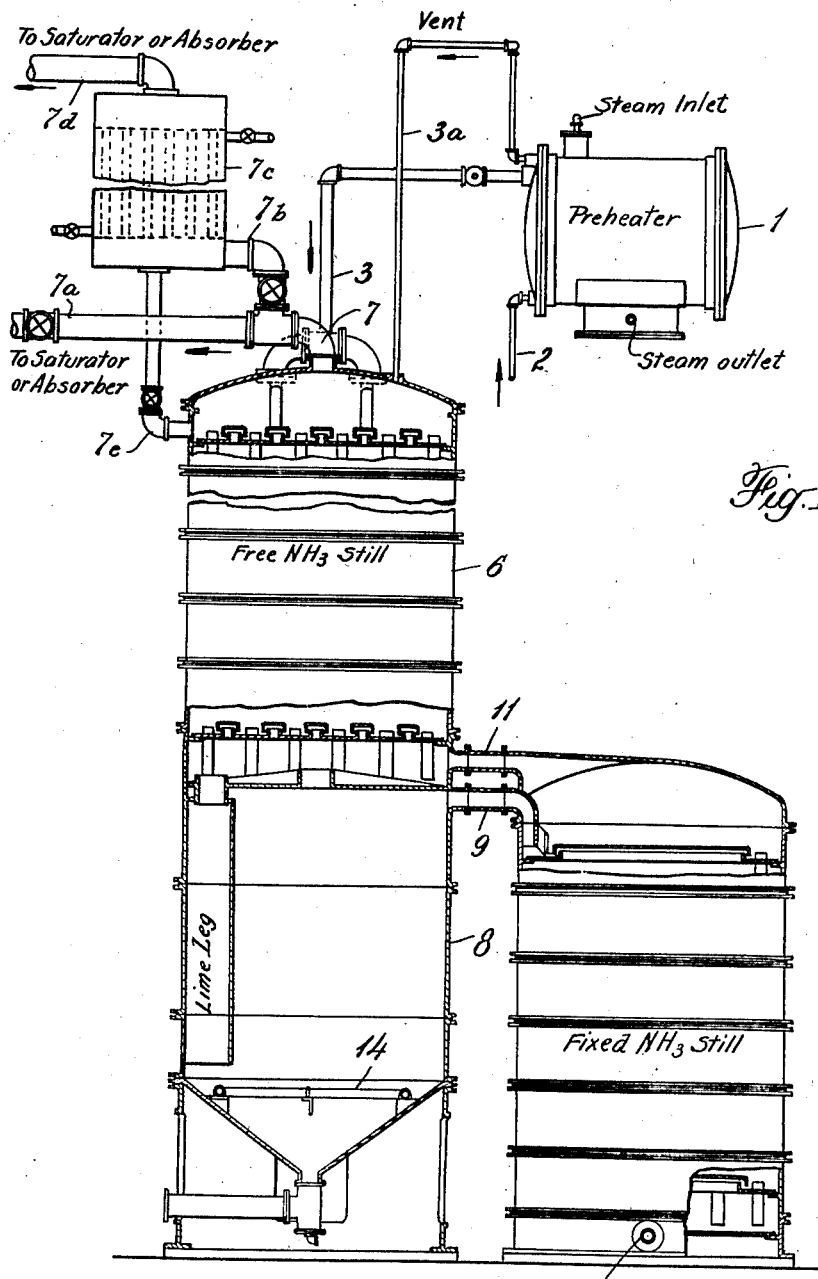

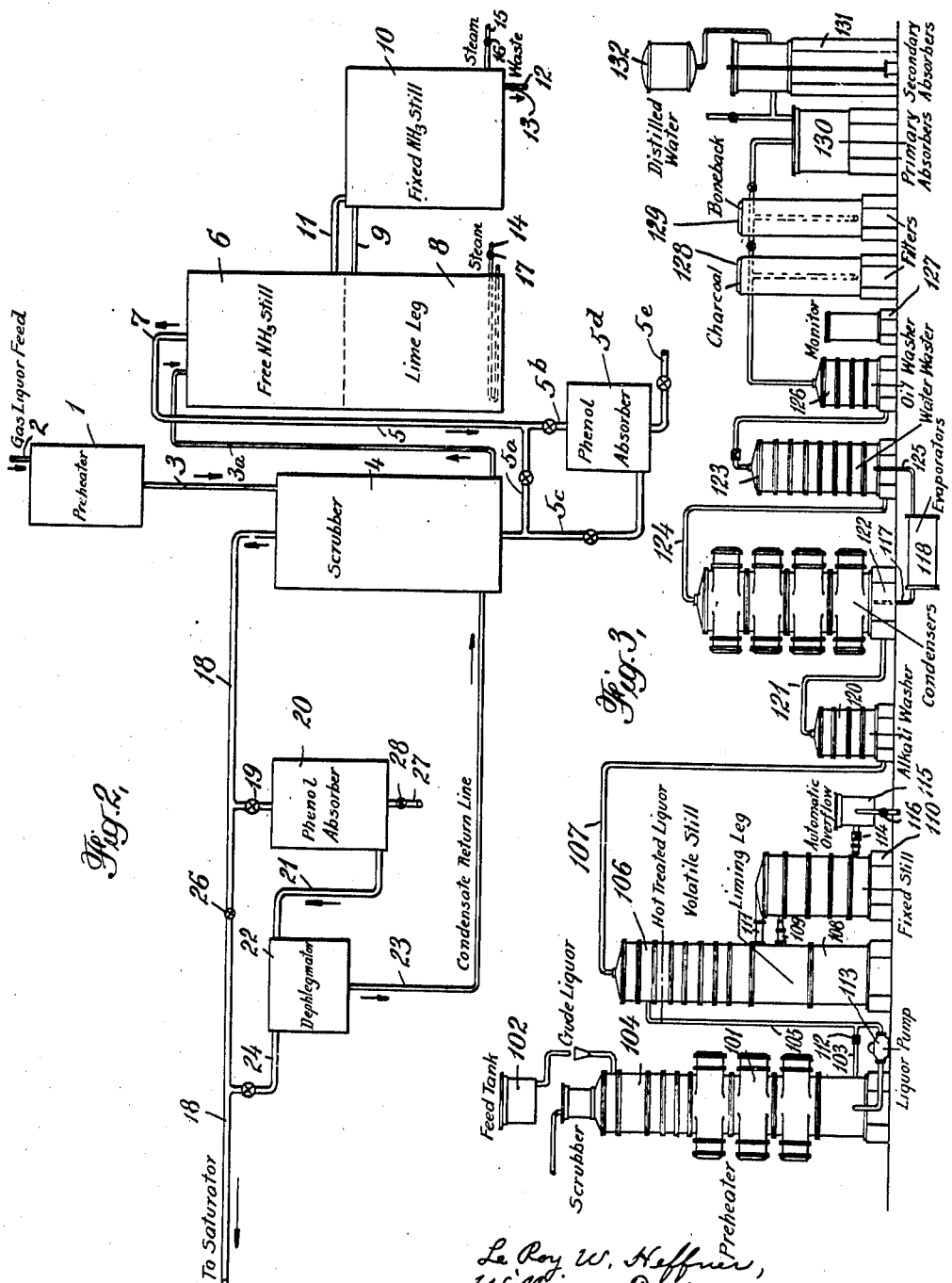

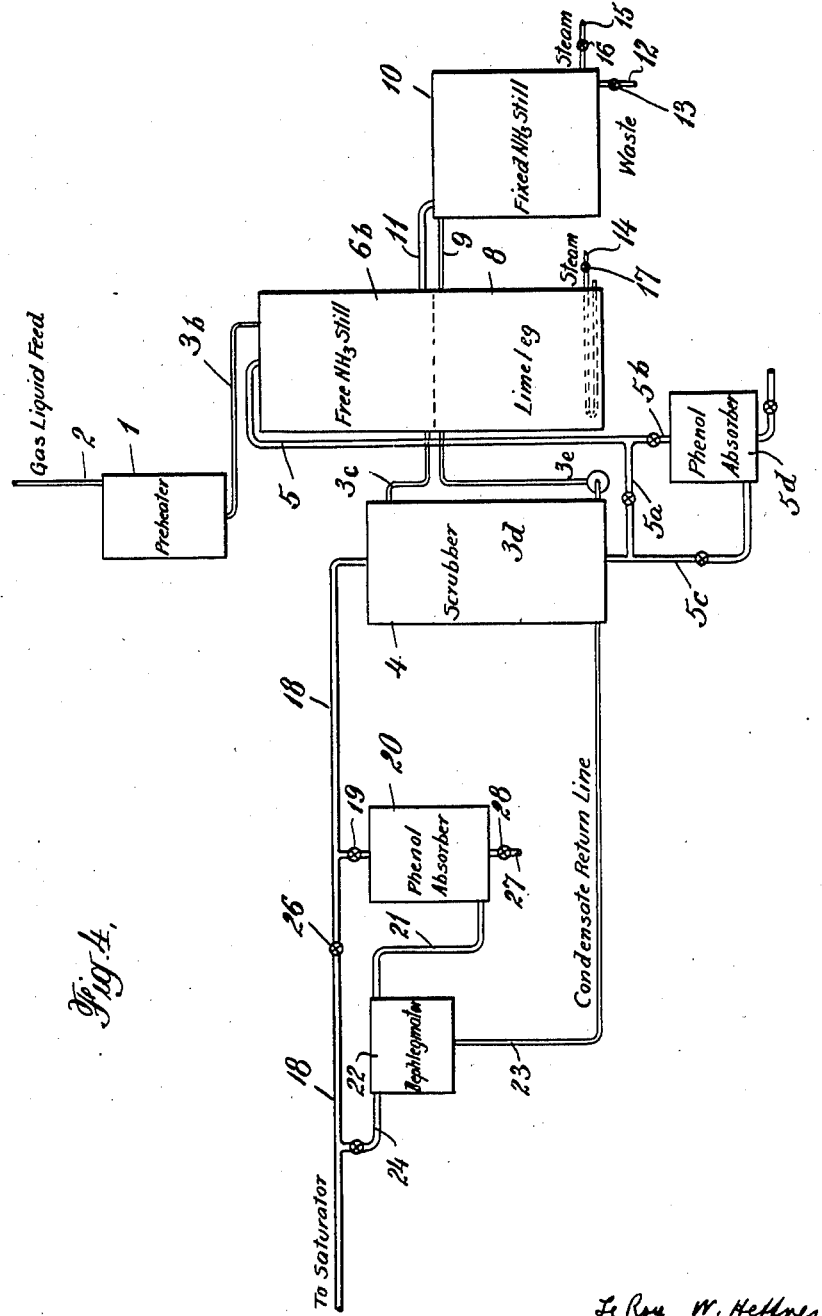

1,566,796

UNITED STATES PATENT OFFICE.

LE ROY WILBUR HEFFNER, OF EAST NORRISTOWN TOWNSHIP, MONTGOMERY COUNTY, AND WILLIAM TIDDY, OF JEFFERSONVILLE, PENNSYLVANIA.

RECOVERY OF PHENOLS FROM AMMONIACAL LIQUOR.

Application filed December 16, 1924. Serial No. 756,194.

*To all whom it may concern:*

Be it known that we, LE ROY W. HEFFNER and WILLIAM TIDDY, both citizens of the United States, residing at East Norristown Township, county of Montgomery, State of Pennsylvania, and Jeffersonville, county of Montgomery, State of Pennsylvania, respectively, have invented certain new and useful Improvements in the Recovery of Phenols from Ammoniacal Liquor; and we do hereby declare the following to be a full, clear, and exact description of the invention, such as will enable others skilled in the art to which it appertains to make and use the same.

This invention relates to the recovery of phenols from ammoniacal gas liquor, etc.

Gas liquor from coke ovens and gas works contains a considerable amount of ammonia together with varying percentages of phenols and phenolic bodies. The phenols may, for example, amount to as much as 4 grams per liter or more while the ammonia runs up to 14 or more grams per liter. According to the usual procedures, the ammonia is removed from the gas liquor in ammonia stills and is recovered in absorbers as ammonium sulfate or in the form of a concentrated solution of ammonia known as aqua-ammonia or concentrated liquor. Phenols are for the most part retained in the waste liquor coming from the ammonia still and are lost.

In the usual process of treating gas liquor, the liquor is introduced cold into the top of the ammonia still, so that the upper portion of the still contains liquor at a temperature considerably below the boiling point of water. In aqua-ammonia plants and in plants manufacturing concentrated ammonia, the liquor is first preheated to drive off carbon dioxide and hydrogen sulfide, before introducing it into the ammonia still, and the still has a reflux condenser or dephlegmator, maintained below the boiling point of water, to condense excess water vapor from the gases. The liquor passing down through the free ammonia still loses most of its free ammonia content and passes into the lower part of the still where it comes into contact with lime in what is known as the lime leg. The lime sets free any ammonia which is present in a combined form and the liquor then passes to a second still known as the fixed ammonia still which volatilizes the ammonia from the liquor and causes the volatilized ammonia to pass upwardly through the free ammonia still. The waste liquor is drawn off from the bottom of the fixed still and is usually allowed to go to waste. Due to its phenol content it cannot be discharged into bodies of water which are to be the source of drinking water, particularly where the water is subjected to chlorination. The ammonia from the ammonia still, in the case of aqua-ammonia manufacture, passes through a dephlegmator, a water and an alkali washer and then through charcoal and bone-black filters and is finally absorbed in distilled water, producing the aqua-ammonia solution of commerce. For the manufacture of ammonium sulfate, the ammonia gas is passed through a saturator containing sulfuric acid.

It is one of the objects of the present invention to recover from gas liquor a substantial proportion or all of the phenols which have heretofore been permitted to go to waste, and, at the same time, to recover the ammonia from the gas liquor.

According to the present invention, instead of introducing cold liquor into the still, or, when the liquor is preheated, instead of running the free ammonia still with a reflux condenser or dephlegmator at a relatively low temperature and refluxing most of the condensible ingredients from the vapors, the liquor in the still head is kept at a relatively high temperature, above 98° C., and a phenol absorber is inserted between the still and the ammonia condenser in order to remove phenolic compounds from the gases. The percentage of phenol which is recovered in the present process depends on the temperature of the escaping vapors and of the liquor in the top of the free ammonia still, and on the ratio between the ammonia and phenol present in the gas liquor in the still. In general, the greater the proportion of ammonia to phenol the greater will be the percentage of phenol removal from the gas liquor, up to the point where all the phenol is removed. If desired, additional ammonia may be added to the gas liquor or may be introduced into the still in order to increase the recovery of phenol and effect substantially complete recovery.

The improved process of the present invention, in its broader aspects, can be carried out in ammonia stills such as are now commonly used in the art, provided they are so constructed or designed that both the vapors and liquor in the top of the free ammonia still can be maintained at a temperature above 98° C., e. g. between 98 and 103° C. Where such free ammonia stills are provided with a reflux condenser or dephlegmator, this should be removed, or provision should be made for heating it so as to maintain a sufficiently high outlet temperature, i. e. 98° C. or higher. In addition, the invention includes a recovery system for purifying the ammonia from its admixed phenolic compounds and for recovering the phenols.

The phenol recovery system, in its general aspect, may be similar to the phenolic recovery systems now used for absorbing and recovering phenols from other sources. For example, the admixed ammonia and phenolic compounds, in vapor form, and admixed with a relatively large amount of water vapor, may be passed through a suitable phenol absorber, such as an alkali washer in which the phenolic compounds are combined with the alkali as alkali phenolate. Owing to the high temperature at which the gases escape from the ammonia still, they may contain a relatively large content of steam or water vapor which tends to condense in and to dilute the alkali liquor used for combining with the phenol if the liquor in the washer is at a lower temperature than the vapors. We find this can be prevented by maintaining the alkali solution at a sufficiently high temperature to drive off the water vapor and maintain the alkali solution in a relatively concentrated state. When this is done, the ammonia vapors are obtained in a purified state but admixed with an excess of steam or water vapor. If a dilute alkali solution is used in the phenol absorber, the hot gases may serve to remove added water from the solution, particularly when the solution is heated to a high temperature, so that the alkali phenolate solution will become concentrated during the process. In order to separate the greater part of the water vapor from the purified ammonia, the admixed ammonia and water vapor escaping from the absorber are subjected to a condensing or dephlegmating treatment, giving a dilute ammoniacal solution, and a relatively dry ammonia gas, which can then be passed to the saturators or used for the production of aqua-ammonia.

For the treatment of gas liquor which is rich in ammonia, the usual ammonia still can advantageously be supplemented by a preliminary countercurrent scrubber, which may be a separate scrubber or added sections on the still itself, in which the preheated gas liquor is caused to flow countercurrent to the ammonia gases driven off from the still. By maintaining the liquor in this countercurrent scrubber at a sufficiently high temperature, e. g. around 98 to 103° C., and by pre-heating the gas liquor to a temperature of 98° C. or higher before introducing it into the countercurrent scrubber, the gas liquor can be freed from phenolic compounds more or less completely during its passage through the scrubber, so that the gas liquor which then flows into the ammonia still is greatly reduced in phenolic content or may be entirely free therefrom. The ammonia content of the liquor in the countercurrent scrubber may be further increased by the return of purified ammonia, after the ammonia has been purified by the separation therefrom of phenolic compounds.

We have found that phenol, in the presence of a large amount of ammonia forms or tends to form ammonium phenolate, which is more volatile than the phenol itself, and that the ammonium phenolate escapes with the ammonia if a sufficiently high temperature is maintained. If the temperature of the vapors or of the liquor with which they come in contact, is not sufficiently high, the phenolate is condensed and held back with the liquor instead of escaping with the ammonia. Accordingly, in operating the ammonia still itself, and in operating the countercurrent scrubber where such a countercurrent scrubber is used, the temperature is maintained sufficiently high, e. g. around 98 to 103° C., to insure that the phenolates will be driven off with the ammonia and prevented from recondensation and re-absorption by the liquor in or going to the still.

In the present process, the ammonia, together with the excess water vapor and phenolic compounds, is taken off from the still at a high temperature and subjected first to treatment to separate the phenols, as by absorption in caustic alkali to form alkali phenolates, and the ammonia is then passed to a saturator or subjected to condensation or dephlegmation to free it from the greater part of its water vapor, and then passed to the saturator. The condensed water, together with its absorbed ammonia, may advantageously be returned to the countercurrent scrubber or even to the ammonia still itself to increase the ammonia content therein and to promote the removal of phenolate, In the application of the invention to an aqua-ammonia system, the usual dephlegmator on top of the ammonia still should be removed, or used as a heater to prevent undue cooling of the vapors, or as a regulated cooler or condenser maintained above 98° C. and the temperature of the liquor and vapors in the still should be maintained sufficiently high to insure the driving off of the phenolic compounds with the ammonia. An absorber for the phenolic compounds is provided, through which the admixed ammonia, phenolic compounds, and moisture are passed, and this absorber is advantageously maintained at a sufficiently high temperature to prevent excessive condensation of water therein. The ammoniacal vapors, thus freed from phenolic compounds, can then be subjected to a refluxing or dephlegmating operation for the condensation of the greater part of the water vapors and to give a relatively dry ammonia gas. This ammonia gas can then be treated in the usual way for the production of aqua-ammonia. The aqueous ammoniacal liquor from the dephlegmator can be evaporated to recover the ammonia therefrom and this ammonia can be added to that used in the production of aqua-ammonia; or a part of this ammonia can be returned to the still itself to increase the ammonia content of the gas liquor therein and to increase the removal of phenolic compounds, where the liquor is itself insufficient in ammonia content for complete removal.

Instead of providing a separate phenol absorber for separating the phenolic compounds from the ammonia vapors, the vapors may be passed directly to a saturator. In order to avoid excessive dilution of the saturator liquor, the ammoniacal vapors can be freed or kept free from excessive amounts of water vapor, either by keeping the temperature of the vapors escaping from the still below about 103° C., or, where the vapors escape at a higher temperature, by passing them through a cooler where their temperature is reduced in order to separate water vapor therefrom by condensation, and the resulting ammonia vapors may then be passed to the saturator. The ammonium phenolate going into the saturator will be decomposed in the sulfuric acid bath and the majority of the phenol set free, and will go out with the inert gases, from which gases the phenols can be recovered by passing the gases through a phenol absorber such as an alkali washer. Any phenols remaining in the saturator bath can be extracted by distilling this bath after a certain concentration has been obtained and the vapors resulting from the distillation passed through a phenol absorber such as an alkali washer for the recovery of the phenol as alkali phenolate.

In the operation of an ammonia still, the temperature of the liquor and of the vapors in the top of the still may in some cases be maintained above 103° C.. such high temperatures promoting the driving off of the ammonium phenolate with the ammonia. At these temperatures, however, an increased amount of water vapor is driven off with the ammonia, and, if the vapors were passed directly to a saturator, the water would dilute the saturator liquor to an objectionable degree. In such cases, the ammonia still is advantageously provided with a reflux cooler or condenser or dephlegmator maintained at a sufficient temperature to cool the gases to a temperature around 103° C. or somewhat lower (but above 98° C.) so that the excess water vapor will be condensed, and so that the ammonia vapors can then be passed directly to the saturator without excessive dilution of the saturator liquor. Where ammonia stills, such as those of aqua-ammonia plants, are now provided with a dephlegmator, such dephlegmator may be used, but in its operation different temperature conditions will be maintained from those which are now maintained in aqua-ammonia stills and dephlegmators. Instead of cooling and condensing the vapors to a temperature below the boiling point of water and returning as much as possible of the water vapor to the still, the temperature is so regulated that both the vapors and the liquor at the top of the still are above 98° C., and so as to prevent reabsorption of phenolic compounds in liquor maintained at a temperature below 98° C.

The invention will be described more in detail in connection with the accompanying drawing which illustrates different embodiments of apparatus, adapted for the practice of the process of the invention. While the different types of apparatus illustrated and described are all adapted for the practice of the process of the invention in its broader aspect, the different apparatus differ from each other in important respects, as will be hereinafter pointed out. So also, the process, as will be understood, is not limited to any particular apparatus.

In the accompanying drawings, Fig. 1 shows an ammonia still adapted for the practice of the process of the invention; Fig. 2 illustrates, somewhat conventionally and diagrammatically, another arrangement of apparatus in the nature of a flow sheet; Fig. 3 shows in elevation an aqua-ammonia apparatus, adapted for carrying out the invention; and Fig. 4 shows a modified apparatus.

The apparatus of Fig. 1 includes an ammonia still having heating means sufficient to maintain the temperature of the vapors and liquid at the top of the free ammonia still sufficiently high, e. g., around 98 to 103° C.

The still includes a preheater 1, heated by steam and having a gas liquor feed pipe 2, and a supply pipe 3 for conveying the preheated liquor to the top of the free ammonia still 6. A vent pipe 3ª is provided for the escape to the top of the still 6, of any vapors formed in the preheater. The still has the usual lime leg 8, having steam heating coil 14. The fixed ammonia still 10 is connected with the lime leg through the connecting pipe 9 and the ammonia from the fixed ammonia still escapes to the bottom of the free ammonia still through the pipe 11. The still illustrated in Fig. 1 may, in practice, be provided with an alkali washer, or other phenol absorber, etc., such as illustrated in Figs. 2 and 3.

The still illustrated has the vapor outlet pipe 7 for the ammoniacal vapors from the still. This pipe has two branches, one branch 7ª with suitable regulating valve therein leading directly to the saturator for absorbing the ammonia in sulphuric acid, or leading directly to a phenol absorber for separating the phenolic compounds from the ammoniacal gases before they are further used. Another branch 7ᵇ having regulating valve therein, connects with the reflux condenser or cooler or dephlegmator 7ᶜ, and the vapors from this reflux cooler escape through the pipe 7ᵈ directly to the saturator, or to a phenol absorber and then to a saturator or ammonia absorber. A return pipe 7ᵉ conveys the condensate from the reflux cooler back to the free ammonia still. The reflux condenser or dephlegmator is arranged for indirect contact of the vapors with the cooling liquid. For example, the cooling liquid, such as water at a regulated temperature and in regulated amounts may flow around tubes or pipes through which the vapors ascend, so that the vapors will be cooled, and so that the condensate therefrom will flow downwardly and collect in the bottom of the dephlegmator, and then return to the ammonia still.

In the operation of the apparatus of Fig. 1, the gas liquor is pre-heated in the pre-heater 1 to a temperature of 98° C. or higher and is fed at this temperature to the top of the free ammonia still 6. In its passage downwardly through the free ammonia still, the greater part or all of the free ammonia is driven off and escapes through the outlet pipe 7. In addition, part or all of the phenolic compounds are removed with the ammonia, largely if not completely as ammonium phenolates. Vapors of ammonia, etc., set free in the pre-heater pass through the vent 3 or to the top of the ammonia still and are removed with the vapors therefrom. From the bottom of the free ammonia still the liquor flows into the lime leg where it comes in contact with lime and where the lime reacts with the fixed ammonia compounds to set free the ammonia. The ammonia thus set free is driven off in the fixed ammonia still 10 and the ammonia vapors passed into the bottom of the free ammonia still and upwardly therethrough, assisting in the formation and the carrying off of the phenols compounds as phenolates.

Where the gas liquor treated is rich in ammonia, this ammonia may in itself be sufficient to effect the removal of a large part of the phenolic compounds. Where, however, the normal ammonia content of the liquor is not sufficient, additional ammonia may be supplied to the still, sufficient to effect the removal of an increased amount of the phenolic compounds or even to effect substantially complete removal thereof.

It will be noted that the free ammonia still of Fig. 1 is shown broken away at an intermediate point to indicate an indefinite height of the still. The still may be of the usual height and with the usual number of sections. In order, however, to provide for additional contact of the ammonia vapors with the pre-heated liquor, the still may advantageously have added sections, in addition to those of the ordinary still, and these will provide an increased scrubbing action of the ammonia vapors rising upwardly through the still through the scrubbing sections and the pre-heated liquor flowing downwardly through these sections and through the free ammonia still. By increasing this counter-current flow and scrubbing action, and by maintaining the temperature of both the liquor and the gases and vapors above 98° C., a more complete driving off and removal of phenolic compounds with the ammonia can be obtained.

Where the temperature of the vapors escaping from the top of the free ammonia still is not too high, e. g. is at 103° C. or more, they may be passed directly to a saturator or to a phenol absorber and then to a saturator. Where the vapors are at a higher temperature and contain an increased amount of water vapor, they may advantageously be subjected to a regulated condensing or refluxing operation in the reflux condenser or dephlegmator 7ᵍ and the temperature cooled to 103° C. or lower with return of the excess water vapor to the still in a condensed form. The vapors can be cooled to a temperature below 103° C. but should not be cooled to a temperature below 98° C., and the liquor in the bottom of the dephlegmator, and returning to the still, should not be cooled below 98° C. The provision of a dephlegmator, as illustrated in Fig. 1, enables the temperature of the escaping vapors to be regulated and controlled, to remove excess water vapor therefrom, while nevertheless permitting escape of phenolic compounds with the ammonia, while the provision of a direct connection 7ª permits the vapors from the still to be passed directly to a saturator or to a phenol absorber without additional dephlegmation, in which case the temperature of the liquor and vapors in the top of the free ammonia still itself, or in the top of the added scrubbing section superimposed thereon, will determine the moisture content of the escaping vapors. The temperature of both the liquor and the vapors at the outlet from the still should be sufficiently high to prevent reabsorption of phenolic compounds in the liquor, i. e. it should be at 98° C. or higher, In the apparatus of Fig. 2 the pre-heater and the free and fixed ammonia stills are given the same reference characters as in Fig. 1, and the still is operated in a similar way, except for the modifications described below.

In Fig. 2 a separate countercurrent scrubber is provided between the gas liquor pre-heater and the free ammonia still and the pre-heated liquor is subjected to the total vapors coming from the ammonia still. That is, the gas liquor from the pre-heater 1 passes through the pipe 3 to the top of the countercurrent scrubber 4 and passes downwardly therethrough, the resulting liquor then passing through the pipe 3ª to the top of the free ammonia still. From the top of the free ammonia still the vapors of ammonia, etc., pass through the pipe 7 to the bottom of the countercurrent scrubber 4 and upwardly therethrough countercurrent to the downflowing pre-heated liquor. The ammoniacal vapors from the top of the countercurrent scrubber 4 may pass through the pipe 18 directly to a saturator or through the branch pipe 19 to a phenol absorber, such as an alkali washer 20. In this absorber they are brought into intimate contact with an absorbent, e. g. a caustic alkali solution which will decompose the ammonium phenolate and form alkali phenolate. The remaining ammoniacal vapors then pass through the pipe 21 to the condenser or dephlegmator 22 in which they are subjected to cooling and a considerable part of the water vapor separated out as ammoniacal liquor which returns through the pipe 23 to the bottom of the countercurrent scrubber 4. The purified and dried ammonia gas then passes through the pipe 24 and the pipe 18 to the saturator or to other place of treatment or use. The alkali phenolate solution collecting in the washer 20 can be drawn off through the outlet pipe 27 having regulating valve 28 therein. By closing the valves in the pipes 19 and 24, the vapors can be passed directly to a saturator.

In Fig. 2 it will be noted that a phenol absorber is arranged so that the vapors passing from the free ammonia still 6 to the scrubber 4 may be passed through the absorber, or by-passed directly from the still to the scrubber. The connecting pipe 5 has a direct branch 5ª, with valve therein, by means of which the ammonia vapors from the still can be passed directly to the scrubber. It also has a branch 5ᵇ with valve therein, by means of which the vapors can pass to the phenol absorber 5ᵈ, for the separation of phenolic compounds therein, after which the purified ammonia gases pass through the branch pipe 5ᶜ to the scrubber. This phenol absorber may contain an alkali solution to break up the ammonium phenolate and form alkali phenolate which may be removed from time to time through the outlet pipe 5ᵉ when the solution is to be replenished.

In the operation of the apparatus of Fig. 2 the gas liquor is first pre-heated to a temperature of 98° C. or higher in the pre-heater 1 and then passes into the scrubber 4 where its temperature is maintained at 98° C. or higher. In this scrubber it is subjected to the scrubbing action of the vapors escaping from the top of the free ammonia still through the pipe 7. These vapors may include ammonia together with ammonium phenolate or they may have the phenolate removed therefrom by the absorber 5ᵈ. The maintenance of the temperature of the scrubber at 98° C. or higher insures that any ammonium phenolate will not be condensed and held in the scrubber but will be driven off to a large extent if not completely with the ammonia escaping through the pipe 18. The gas liquor thus freed from a considerable part of its ammonia and phenolate enters the top of the free ammonia still where the usual distilling operation takes place, the greater part or all of the remaining free ammonia being set free in the free ammonia still and the fixed ammonia being then set free by the action of lime and distilled in the fixed ammonia still. The ammonia set free in the fixed ammonia still passes upwardly through the free ammonia still and serves to assist in carrying away any remaining phenolic compounds which the liquor contains at this place. By providing a sufficient amount of ammonia in the still or in the scrubber or in both it is possible to effect substantially complete removal of phenolic compounds so that the liquor that comes in contact with the lime in the lime leg will contain no phenolic compounds. Inasmuch as such compounds if present in the liquor coming in contact with the lime will combine with the lime to form calcium phenolate and will be held and prevented from volatilizing, it is important to effect removal more or less completely of the phenolic compounds from the liquor before it comes in contact with the lime.

By operating the phenol absorbers at a high temperature, for example, by using a strong caustic soda solution and heating it to a high temperature, absorption or condensation of water vapor is prevented, and a strong solution of sodium phenolate can be obtained. In the case of the phenol absorber 5ᵈ, this maintenance of the absorbent solution at a high temperature prevents cooling of the ammonia gases entering the bottom of the scrubber 4. In the case of the phenol absorber 20, the hot ammonia and admixed water vapor pass to the dephlegmator or condenser 22 where the vapors are cooled and the ammonia is separated from the greater part of its admixed water vapor. The condensed water together with absorbed and condensed ammonia pass back to the countercurrent scrubber as already pointed out. In addition a further amount of ammonia gas can if desired be returned either to the countercurrent scrubber or to the free ammonia still to increase the amount of phenols driven off, and to effect substantially complete removal of phenols from the liquor. In the apparatus illustrated in Fig. 2 the lime leg is heated by the steam coil 14 having regulating valve 17 therein and the fixed ammonia still by the steam coil 15 having regulating valve 16. An outlet pipe for the waste liquor from the fixed ammonia still is indicated at 12 having valve 13 therein.

When the alkali solution in the washers becomes charged with phenols, they may be drawn off and replenished, and the phenol can be recovered therefrom in any suitable manner, as for example, by acidifying the solution and distilling off the phenol, or the alkali phenolate may be utilized for other purposes.

In the apparatus of Fig. 2, the countercurrent scrubber 4 may be of any suitable construction which will permit effective countercurrent contact between the gases and liquor. In effect, it forms a countercurrent extension of the free ammonia still itself, similar to the added sections on top of the free ammonia still of Fig. 1. The provision of a separate scrubber, however, makes possible the countercurrent treatment of the preheated gas liquor before it reaches the usual free ammonia still, as well as the freeing of the vapors from phenol before they enter the separate scrubber.

Fig. 3 illustrates a modified apparatus for producing aqua-ammonia and at the same time recovering a large percentage or all of the phenol from the gas liquor.

Gas liquor flows from the feed tank 102 into the scrubber 104 and from thence into the preheater 101 where the liquor is heated to a temperature approximately 98° C. to 99° C. The hot liquor then passes through the pipe 103 and 105 into the free ammonia or volatile still 106 or, if desired, the valve 112 may be closed and the hot liquor pumped under positive pressure by the liquor pump 113. The free ammonia still 106 is maintained at a temperature such that both the liquor and vapors are at or above 98° C. Most of the free ammonia and a large percentage of the phenol as ammonium phenolate is volatilized in the still 106, the liquor passing down into the liming leg 108 while still containing a small percentage of phenol, if the phenol is not completely removed. The lime in the lime leg sets free the combined ammonia and the liquor passes into the fixed ammonia still 110 through the pipe 109. In the fixed ammonia still the ammonia set free by the lime is volatilized and is returned to the volatile still 106 through the pipe 111. An automatic overflow 115, controlled by valves 114 and 116, provides for the overflow of liquor from the fixed ammonia still.

The vapors containing ammonia and phenolate from the free ammonia still pass through the pipe 107 into the alkali washer 120 where the ammonium phenolate is decomposed and the phenol removed from the vapors in the form of alkali phenolate, which is withdrawn from time to time and the phenol recovered as above described. The phenol-free vapors from the alkali washer pass through pipe 121 into the ammonia condenser 122 where most of the water is condensed out and flows into the evaporators 118 through pipe 117. The ammonia from the condenser passes into the water washer 123 through the pipe 124 and the ammonia dissolved in the condensate is led from the evaporators 118 into the water washer through pipe 125.

The ammonia is then washed as usual with oil in the oil washer 126, with the monitor 127, and is filtered in the charcoal filter 128 and bone black filter 129 and finally passed into the absorbers 130 and 131, where it is absorbed in distilled water supplied from the tank 132.

It will be seen that the apparatus of Fig. 3 differs from the usual aqua-ammonia plant in that the dephlegmator is removed from the top of the ammonia still and an alkali washer is introduced between the top of the ammonia still and the dephlegmator or condenser. This permits the free ammonia still to be operated at a higher temperature and without refluxing and return of water and phenolate to the still, and permits the ammonia with admixed water vapor and phenolate to pass over to the alkali washer where the phenolate is decomposed and the phenol absorbed as alkali phenolate before the ammonia is subjected to condensation to remove the admixed water vapor therefrom. This removal of the condensers to a distance from the still and the introduction of an alkali washer between the still and condenser, together with the operation of the still itself at a sufficiently high temperature permits the phenolate to be removed from the still with the ammonia and to be recovered before the ammonia is subjected to condensation to remove the water vapor therefrom. By operating the alkali washer at a high temperature, the water vapor is prevented from condensing in the washer and from diluting the alkali solution.

While the apparatus illustrated in Fig. 3 has the usual dephlegmator removed from the top of the ammonia still, the dephlegmator can nevertheless be used in the manner described in connection with Fig. 1. Instead, however, of cooling the ammonia vapors in the manner in which they are cooled in aqua-ammonia plants, to separate as much water vapor as possible from them, the dephlgemator or reflux cooling of the vapors is regulated and maintained at a temperature above 98° C. so as to avoid reabsorption of ammonium phenolates. Where such a dephlegmator is provided, a temperature considerably higher than 98° C. can be maintained in the free ammonia still, and the dephlegmator can be relied upon to cool the vapors down to a temperature such that excessive amounts of water vapor are removed, but ammonium phenolate nevertheles permitted to pass off with the ammonia.

The apparatus of Fig. 4 is a modified apparatus in which the preheated gas liquor is brought into contact with the total ammonia evolved from the gas liquor without recycling of ammonia vapor. In this figure, the same reference numerals are used as in Figs. 1 and 2 for corresponding parts of the apparatus, with the suffix $b$ appended thereto in certain cases.

In this apparatus, the gas liquor from the preheater charge passes at a temperature of 98° C. or higher to the top of the free ammonia still $6^b$ and flows downwardly therethrough. From the bottom of the free ammonia still the liquor flows through the pipe $3^c$ to the top of the countercurrent scrubber 4, in which the liquor is maintained at a temperature of 98° C. or higher. The liquor flows downwardly through the scrubber and leaves the base of the scrubber through the pipe $3^d$, through which it is pumped by the pump $3^e$, to the lime leg 8 of the ammonia still, and then through the regular fixed still. The ammoniacal vapor from the free ammonia still passes off through the pipe $5^b$ to the bottom of the countercurrent scrubber 4 and passes upwardly therethrough countercurrent to the liquor.

The general arrangement of the apparatus of Fig. 4 is similar to that of Fig. 2 except for the different arrangement of the countercurrent scrubber with reference to the ammonia still. In the apparatus of Fig. 2, the preheated liquor first enters the scrubber and then passes to the free ammonia still; while in the apparatus of Fig. 4, the liquor is first preheated and passes to the free ammonia still and subsequently to a countercurrent scrubbing before it enters the lime leg. In the apparatus of Fig. 4, the ammonia set free in the fixed ammonia still passes upwardly through the free ammonia still and the ammoniacal vapors are taken off from the top of the free ammonia still at a temperature sufficiently high to insure the carrying off of phenolic compounds with the ammonia, i. e., a temperature of 98° C. or higher. The total amount of ammonia is then caused to pass countercurrent to the liquor in the scrubber 4.

A phenol absorber $5^d$ may be provided in Fig. 4 similar to the phenol absorber $5^a$ in Fig. 2. By proper manipulation of the valves in the pipe $5^a$, $5^b$ and $5^c$, the phenol absorber can be omitted or included as desired. When the gases from the free ammonia still are passed through the phenol absorber (containing, for example, a solution of caustic soda), the ammonium phenolate will be decomposed, the phenol will be combined with the caustic soda as sodium phenolate, and the ammonia set free will be carried along with the other ammonia into the countercurrent scrubber. By purifying the ammonia in this way, the liquor in the scrubber will be subjected to the countercurrent action of the ammonia and, by maintaining the scrubber at a temperaure of 98° C. or higher, further opportunity is presented for the ammonia to combine with and carry away the phenolic compounds as phenolate. The phenolic compounds carried over from the scrubber through the line 18 can be treated, for example, as described in connection with Fig. 2 above. Where the amount of phenolic compounds in the liquor is small with reference to the ammonia content, the phenol absorber $5^d$ may be omitted and the ammonia may be sufficient in such case to effect substantially complete removal of the phenol. With the phenol absorber available for use where desired, and with the arrangement of Fig. 4, substantially complete removal of phenolic compounds can be effected, particularly where the gas liquor is high in ammonia; and this can be effected without recycling of ammonia.

In the apparatus of Fig. 3, as well as in the apparatus of Figs. 1, 2 or 4, where the normal ammonia content of the gas liquor is low or is insufficient to effect complete removal of phenolic compounds as ammonium phenolate, additional ammonia may be supplied to the still to increase the phenolic recovery. Even without the addition of ammonia, however, an important recovery of phenols can be obtained, particularly from gas liquor which is itself rich in ammonia. Where the ammonia content in the still is to be increased, the ammonia may advantageously be that which is recovered from the process itself, after purification from admixed phenolate. We do not, however, claim herein the cyclic process in which the ammonia is so purified and returned to the still, inasmuch as such cyclic process and apparatus forms the subject of a separate application. With such cyclic operation, it is readily possible to recycle sufficient ammonia to insure that substantially all of the phenolic compounds will be driven off so that they may be recovered, and so that the waste liquor from the still will be freed from objectionable phenolic constituents. Even without such recycling of ammonia, however, and particularly if the gas liquor is itself rich in ammonia, the process of the present invention permits the recovery of important amounts of phenol from the gas liquor which are normally lost and not recovered. The present process, accordingly, provides for a new source of recovery of phenols, and, to the extent that the phenols are recovered, the waste liquor is freed from objectionable phenolic constituents.

We claim:

1. The process of treating gas liquor containing phenolic impurities which comprises subjecting the liquor to distillation for the recovery of ammonia therefrom, the temperature of the liquor and vapors at the outlet of the ammonia from the still being about 98° C. or higher to drive off ammonium phenolate with the ammonia.

2. The process of treating gas liquor containing phenolic impurities which comprises subjecting the liquor to distillation for the recovery of ammonia therefrom, the temperature of the liquor and vapors being maintained around 98° C. or higher, whereby phenol is removed with the ammonia as phenolate.

3. The process of treating gas liquor containing phenolic impurities which comprises subjecting the same to distillation in a free ammonia still for the removal of free ammonia therefrom, then setting free the fixed ammonia and passing it through the free ammonia still, and maintaining the temperature of the liquor and vapors at the top of the free ammonia still at about 98° C. or higher, whereby phenol is driven off from the free ammonia still as phenolate with the ammonia.

4. The process of treating gas liquor containing phenolic impurities which comprises subjecting the same to distillation at a temperature of around 98° C. or higher to remove phenolic compounds with the ammonia, and freeing the ammonia from phenolic compounds by passing the admixed gases through an absorbent for the phenolic compounds.

5. The process of treating gas liquor containing phenolic impurities which comprises pre-heating the liquor, introducing the pre-heated liquor into an ammonia still, the liquor in the upper portion of which is maintained at a temperature around 98° C. or higher to drive off phenolic compounds with the ammonia, passing the vapors containing the phenolic compounds and ammonia through a phenol absorber, and separately recovering the phenol and ammonia.

6. The process of treating gas liquor containing phenolic impurities which comprises pre-heating the liquor, introducing the preheated liquor into an ammonia still, the liquor in the upper portion of which is maintained at a temperature of about 98 to 103° C., and passing the vapors from the ammonia still through a phenol absorber to separate phenolic compounds from the ammonia.

7. The process of treating gas liquor containing phenolic impurities which comprises pre-heating the liquor, introducing the pre-heated liquor into an ammonia still, the liquor in the upper portion of which is maintained at a temperature around 98° C. or higher to drive off phenolic compounds with the ammonia, passing the admixed vapors through a phenol absorbent, subsequently cooling the ammonia vapors to separate water vapor therefrom, and returning the ammoniacal liquor thus separated to the liquor from which the ammonia is being driven off.

8. The process of treating gas liquor containing phenolic impurities which comprises pre-heating the same, introducing the pre-heated liquor into an ammonia still, the liquor in the upper portion of which is maintained at temperature around 98° C. or higher to drive off phenolic compounds with the ammonia, and conveying any vapors set free in the pre-heater to the ammonia still for admixture with the vapors escaping therefrom.

9. The process of treating gas liquor containing phenolic impurities which comprises preheating the liquor, introducing the pre-heated liquor into an ammonia still, and subjecting the pre-heated liquor before entering the still to the scrubbing action of the ammonia given off from the still, the temperature of the preheated liquor during such scrubbing operation being around 98° C. or higher to drive off phenolic compounds with the ammonia.

10. The process of treating gas liquor containing phenolic impurities which comprises pre-heating the liquor, passing the pre-heated liquor through a scrubber and then introducing it into an ammonia still, the liquor in the upper portion of which is maintained at a temperature around 98° C. or higher to drive off phenolic compounds with the ammonia, and passing the ammonia and phenolic compounds so driven off through the scrubber countercurrent to the pre-heated liquor, the temperature of the liquor in the scrubber being maintained sufficiently high to remove phenolic compounds with the ammonia.

11. The process of treating gas liquor containing phenolic impurities which comprises pre-heating the same, passing the preheated liquor through a scrubber and then to an ammonia still, passing the ammonia vapors from the still through the scrubber countercurrent to the pre-heated liquor, the temperature of the liquor in the scrubber and in the still being around 98° C. or higher to drive off phenolic compounds with the ammonia, passing the admixed ammonia and phenolic compounds through a scrubber to remove the phenolic compounds, cooling the resulting ammonia to separate water therefrom and returning the ammoniacal water so separated to the scrubber.

12. The improvement in the production of aqua-ammonia from gas liquor containing phenolic impurities which comprises distilling off the ammonia from the ammonia still with maintenance of the liquor at a temperature around 98° C. or higher to remove phenolic compounds with the ammonia, passing the resulting vapors through an absorbent for absorbing the phenolic compounds, and subsequently subjecting the purified ammonia vapors to a condensing or dephlegmating operation to separate water vapors therefrom.

13. The process of treating gas liquor containing phenolic impurities which comprises pre-heating the liquor, introducing the pre-heated liquor into an ammonia still, the temperature of the liquor in the upper portion of which is maintained around 98° C. or higher to drive off phenolic compounds with the ammonia, passing the resulting admixed vapors through an alkali washer maintained at a sufficiently high temperature to prevent condensation of water vapor, and subsequently cooling the admixed ammonia water vapor to separate water from the ammonia.

14. The process of treating gas liquor containing phenolic impurities which comprises pre-heating the liquor to a temperature of 98° C. or higher, introducing the pre-heated liquor into an ammonia still and subjecting the same to distillation therein with maintenance of the temperature of the liquor around 98° C. or higher to drive off ammonium phenolate with the ammonia, and subjecting the escaping ammonical vapors to a regulated refluxing or dephlegmating treatment at a temperature sufficiently high to insure the driving off of ammonium phenolate with the ammonia while condensing the excess water vapor.

15. The process of treating gas liquor containing phenolic impurities which comprises preheating the liquor, passing the preheated liquor through a scrubber and then introducing it into an ammonia still, the liquor in the upper portion of which is maintained at a temperature around 98° C. or higher to drive off phenolic compounds with the ammonia, passing the ammonia and phenolic compounds so driven off through a phenol absorber to separate phenolic compounds from the ammonia, and passing the resulting purified ammonia through the scrubber countercurrent to the preheated liquor, the temperature of the liquor in the scrubber being maintained sufficiently high to remove phenolic compounds therefrom with the ammonia.

16. The process of treating gas liquor which comprises preheating the liquor, passing the preheated liquor through a free ammonia still with resulting evolution of ammonia, passing the liquor from the free ammonia still through a countercurrent scrubber, countercurrent to the ammoniacal vapors given off from the free ammonia still, subsequently passing the liquor to the fixed ammonia still with resulting setting free of ammonia therefrom and passing the ammonia set free in the fixed ammonia still to the free ammonia still.

In testimony whereof we affix our signatures.

LE ROY WILBUR HEFFNER.
WM. TIDDY.